(12) United States Patent
Jacquet et al.

(10) Patent No.: US 6,483,852 B1
(45) Date of Patent: Nov. 19, 2002

(54) METHOD AND APPARATUS FOR CONNECTING NETWORK SEGMENTS

(75) Inventors: Philippe Jacquet, Buc (FR); Paul Muhlethaler, Maisons-Laffitte (FR)

(73) Assignee: Inria Institut National de Recherche en Informatique et en Automatique, Chesnay Cedax (FR)

( * ) Notice: Subject to any disclaimer, the term of this patent is extended or adjusted under 35 U.S.C. 154(b) by 0 days.

(21) Appl. No.: 09/210,456

(22) Filed: Dec. 14, 1998

(30) Foreign Application Priority Data

Dec. 15, 1997 (FR) .............................................. 97 15870

(51) Int. Cl.⁷ .............................................. H04L 12/28
(52) U.S. Cl. ........................ 370/466; 370/392; 370/401
(58) Field of Search ................................ 370/356, 389, 370/392, 401, 402, 403, 404, 405, 406, 466

(56) References Cited

U.S. PATENT DOCUMENTS

| | | | |
|---|---|---|---|
| 5,321,542 A | | 6/1994 | Freitas et al. |
| 5,331,634 A | | 7/1994 | Fischer |
| 5,426,637 A | * | 6/1995 | Derby et al. ................ 370/401 |
| 5,490,139 A | | 2/1996 | Baker et al. |
| 5,655,219 A | | 8/1997 | Jusa et al. |
| 5,784,573 A | * | 7/1998 | Szczepanek et al. ..... 395/200.8 |
| 5,809,021 A | * | 9/1998 | Diaz et al. ................... 370/364 |
| 5,920,566 A | * | 7/1999 | Hendel et al. ............... 370/401 |
| 6,101,188 A | * | 8/2000 | Sekine et al. ................ 370/401 |

FOREIGN PATENT DOCUMENTS

| | | |
|---|---|---|
| EP | 0 599 764 A1 | 6/1994 |
| EP | 0 766 427 A2 | 4/1997 |
| EP | 0 766 490 A2 | 4/1997 |
| WO | WO 97 37467 A | 10/1997 |

* cited by examiner

*Primary Examiner*—Hassan Kizou
*Assistant Examiner*—Tim Spafford
(74) *Attorney, Agent, or Firm*—Rabin & Berdo, P.C.

(57) ABSTRACT

A connection device connects a radio network and a cabled network communicating respectively by way of messages encapsulated according to radio and cable protocols, and includes a storage module containing a routing table, and a processing module for managing exchanges of data as a function of the routing table. The processing module includes a management module capable on the one hand of disencapsulating a message received from the radio network, in order to extract routing information therefrom and then to compare this information with the routing table in order to choose at least one re-sending network for the message, and on the other hand of re-encapsulating the message in the radio network format or according to a mixed radio format, having radio and cable capsules, depending on whether the re-sending network chosen is the radio network or the cabled network, with a view to re-sending it in the chosen re-sending network segment.

23 Claims, 8 Drawing Sheets

METHOD AND APPARATUS FOR CONNECTING NETWORK SEGMENTS

FIELD OF THE INVENTION

The field of this invention relates to computer networks enabling exchanges of data and information between units or stations in different networks. Different networks here means either several (at least two) radio networks which can function using different channels and/or protocols, or a combination of at least one radio network and at least one cable network (electrical or optical fibre cables).

BACKGROUND OF THE INVENTION

In the case of a combination of radio and cable networks, mobile stations coexist with fixed stations connected to the cable via connection devices (or bridges), a storage module which stores at least one routing table, and a processing (or switching) module which manages data exchanges according to the routing table.

It is well known that such connection devices (or bridges) are generally provided with network interfaces (one for each network segment), the different network interfaces being able to have parts which are possibly common. In this case, the processing (or switching) module manages the data exchanges at the network interfaces, according to the said routing table.

The invention concerns more particularly the connection devices (or bridges) between at least segments of a so-called "main" network (in which one station has sent a-message intended for at least one other station in the same network) communicating by means of messages provided with a so-called main capsule complying with a protocol based on a first format and at least one segment of at least one "ancillary" network communicating by way of messages provided with an ancillary capsule complying with a protocol based on a second format.

In the following, "encapsulated message" will mean a message consisting of data and a "capsule" containing information peculiar to the format of the network concerned.

In addition, bridge means a device providing the transfer of a message from one network to one or more other networks. Such bridges can be simple repeaters when they are used only for relaying data frames (or packets). However, in certain cases, it may be a question of so-called "intelligent" bridges which can constitute what a person skilled in the art refers to as "spanning trees". However, under certain operating conditions, such intelligent bridges can momentarily block the transmission of messages, preventing any connection between two subscribers on the same network. This is notably the case when a message is repeated on a (cabled) section, and an intelligent bridge deems that the source of the said message is a fixed station in the section and that it is consequently necessary to filter the messages (or block one transmission direction) for a certain period of time, which prevents access to the said source.

This drawback is particularly inconvenient when a-mobile station (in a radio network) is caused to change (cabled) section in order to communicate with the remainder of the data transmission installation to which it belongs.

This is because, in this type of installation, the mobile and connecting stations (or relays) generally comprise a memory in which there is stored a routing table which enables their processing module to determine the optimum path for reaching the station or stations to which the message which they have just received relates. However, in order to allow the updating of the routing tables, the mobile and connecting stations exchange so-called "service" messages which indicate the movements of the different mobile stations, with respect to each other and relative to sections.

In addition, the bridges receive messages from the mobile stations, which they next transmit over the cable network without any real modification, because the bridges assimilate these mobile stations to fixed stations in the cable network. Consequently, as soon as a mobile station moves, this poses a real problem which may result either in a blockage of a section of network by a bridge; one or more mobile stations no longer being able to communicate with remote stations, or in the impossibility of determining the optimum path which will enable a mobile station to communicate with a remote station. This could occur with "intelligent" bridges.

The aim of the invention is therefore to procure a connection device which does not have the above-mentioned drawbacks.

SUMMARY OF THE INVENTION

To this end it proposes a connection device of the type described in the introduction, in which the processing module comprises a management module able on the one hand to disencapsulate a message received from the said main network (to withdraw its main capsule) so as to extract routing information therefrom, then to compare this information with the stored routing table in order to choose, from amongst the main and ancillary networks, at least one re-sending network segment for the disencapsulated message, and on the other hand to add to the said disencapsulated message, before it is re-sent, a main capsule or a mixed capsule, including a main capsule and an ancillary capsule, depending on whether the re-sending network chosen is the main network or an ancillary network, so as to re-send the thus re-encapsulated message in the segment of the chosen re-sending network.

Thus, by virtue of the connection device (or hybrid station) according to the invention, it is possible to transform several networks independent of each other into a super-network in which the messages can pass from a segment of a main network to another segment of this main network, via a segment of an ancillary network which in some way serves as a "gateway".

According to another characteristic of the invention, the management module is arranged to add, to the re-encapsulated message to be re-sent, a protocol designating the format of the main network segment from which this message came.

This makes it possible to keep a trace of the (main) network which is the origin of the message to be transmitted, and consequently to inform the routing tables of the hybrid stations (or connection device) about the stations which can be accessed by this network. This is particularly advantageous when, notably, main networks of the same types (or segments of a main network) are isolated from each other, because of their separation or else because of obstacles.

The connection device according to the invention is particularly adapted to the main and ancillary networks respectively of the radio network and cabled network types. The cabled network, allowing higher transmission speeds, can therefore be used as a short-cut. However, the device may also make it possible to connect together segments of radio networks which can function on respective channels which are different or substantially identical.

When the main and ancillary networks are two radio networks functioning on the same channel, but with different protocols, the architecture of their two network interfaces (on the assumption that the interconnection device has one for each network) may at least partially merge into a physical interface with the ether (communication medium).

Naturally, a connection device (or hybrid station) may allow the connection of more than two networks, for example three or four or even more, whether they are all of the radio type or of radio and cabled (mixed) types.

According to yet another characteristic of the invention, the format of a radio network can be chosen from at least the "HIPERLAN" and IEEE 802.11 standards, and the format of a cabled network can be chosen from at least the IEEE 802.3, 802.5 and ANSI.FDDI standards.

The HIPERLAN format is notably described in the publications of the European Standardization Institute (ETSI) and more particularly in the technical standard ETS-300-652.

In the case of IEEE 802.11, the device can be situated at an interface with a distribution system (the terminology in the standard), in the access point and, where applicable, this distribution system can be supported by the same radio interface as the basic service sets BSS (using this same terminology), without necessarily sharing the same channels. Preferentially, and in order to simplify the physical "architecture" of the stations and improve the connectivity of the network, the wireless distribution system can adopt the same channels as the basic services, or the same synchronized frequency jumping codes.

Advantageously, when a message received by a receiving device is to be relayed by at least one remote interconnection device, referred to as "intermediate", the module managing the receiving device can place the address of the intermediate device in the capsule of the ancillary re-sending network which it has chosen. In addition, it is advantageous for the segments of the ancillary network to be arranged so as to allow the use of group addresses each designating a predetermined set of connection devices.

In this way, it is possible to differentiate, on an ancillary cabled network, the conventional fixed stations of the hybrid stations. This enables the messages which are circulating in the cable network and are intended for hybrid stations to be ignored by the conventional fixed stations. A group address serves to broadcast service messages or data intended for a subset of the connected stations, for example the hybrid stations, without affecting the other stations, such as for example the conventional fixed stations. For the exchange of data in point-to-point mode, the conventional individual addresses are used.

According to yet another characteristic, the management module is arranged so as to determine the format of the main network in a message provided with a mixed capsule, so that the routing information for this message is analysed only if this format is present. This can be effected by detecting the protocol code. This makes it possible for a distinction to be made between the messages coming from the fixed stations and having to be processed by higher protocol levels, and the messages coming from the hybrid stations and requiring routing processing by the receiving management module.

In the case of mixed networks (radio/cabled), it is particularly advantageous for the management module to be capable of extracting, from a service message issuing from the main network (radio), service information relating to routing table modifications, so as to update this routing table. This makes it possible to take account of modifications to the position of the mobile stations and therefore to re-calculate if necessary the preferential routings between the transmission relays.

However, it is also highly advantageous for the management module to be capable of processing service messages from the main network passing through ancillary network segments and notably cabled ones. In this case an "ancillary" service message will be formed from the service message of the main network and at least one ancillary capsule. In addition, some of the service messages may include a group address. Likewise, the management module can be arranged to process so-called "broadcasting" messages intended for several destinations in the main network and passing over at least one of the ancillary networks using a group address.

Since a connection device can be the destination of a message, or else the sender of the message when it comprises a higher processing stage, it is under these circumstances particularly advantageous for the management module to be capable of transmitting, at such a higher processing stage, the data contained in a message which has arrived at its destination. The idea described here consists of using an ancillary network as an extension of a main network in order to transmit service messages over this ancillary network so that the connection stations can acquire an at least partial knowledge of the topology of the network.

Likewise, the management module must be able to add to a message created locally by a higher processing stage, a main capsule or a mixed capsule according to the re-sending network segment determined according to the destination address of the message and the routing table, with a view to sending the encapsulated message in the segment of the determined sending network.

Preferably, the management module is also capable of controlling the sending of service messages, not only at the local request of a higher state, but also as a transmission relay between remote connection devices, for the exchange of routing information enabling the routing tables of each one to be updated. Such service messages will preferably be intended for the exchange of routing information for updating routing tables for the connection devices.

In addition, the processing means are preferably capable of maintaining at least one list of stations in the network services which they receive, and able to transmit this list in the form of a service message, which enables them reciprocally to maintain a list of stations which receive them from the service messages which they receive.

The processing means are, also preferably, capable of maintaining a topological directory designating at least some of the stations with which they can communicate, directly or indirectly, and define the route or routes of this communication, which enables them to inform themselves, and to give information to the destinations, about the state of symmetry of the links between stations in the cabled network.

The invention also proposes a method of exchanging data, via the aforementioned connection device, between at least segments of a "main" network communicating by means of messages provided with a main capsule complying with a protocol based on a first format and at least one segment of at least one "ancillary" network communicating by means of messages provided with an ancillary capsule complying with a protocol based on a second format, a method in which the following steps are provided:

withdrawing the main capsule of a message received by the connection device of the main network so as to extract routing information therefrom, comparing the information extracted from the routing table stored in order to choose, from amongst the said main and ancillary networks, at least one re-sending network segment for the said disencapsulated message, and adding a main capsule or a mixed capsule to a disencapsulated message, said mixed capsule including a main capsule and an ancillary capsule, depending on whether the chosen re-sending network is the main network or an ancillary network, so as to resend the re-encapsulated message in the chosen re-sending network segment.

BRIEF DESCRIPTION OF THE DRAWINGS

Other characteristics and advantages of the invention will emerge from an examination of the following detailed description, and the accompanying drawings, in which.

DETAILED DESCRIPTION OF THE PREFERRED EMBODIMENTS

Figure 1:
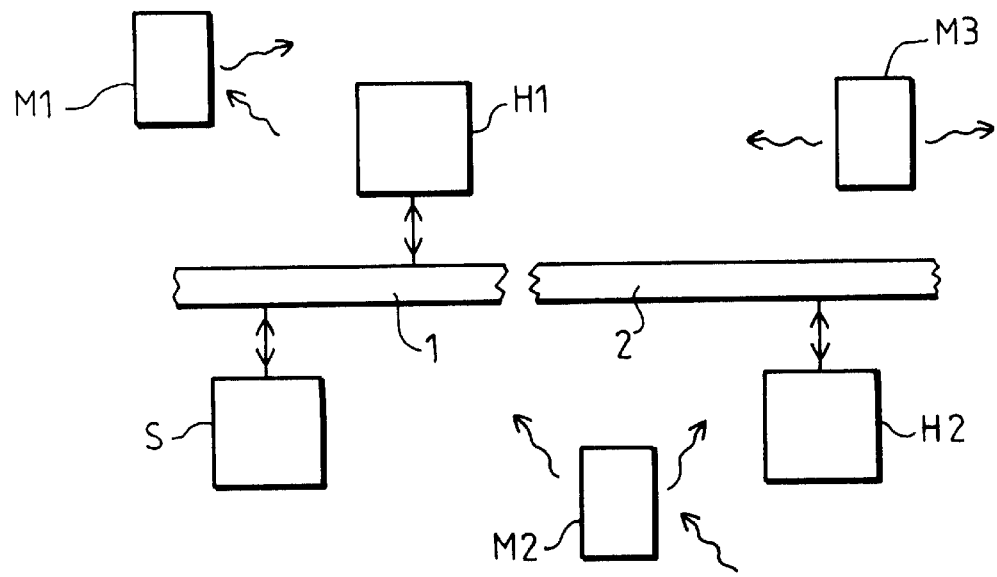
FIG. 1 is a highly simplified diagram of a mixed installation with radio and cabled networks equipped with hybrid stations according to the invention.

The Applicant described, in an earlier Patent Application FR 9509928, a radio network of the type known as "random access", making it possible to resolve the problems of collision between several stations which may transmit at the same time. Such a network allows dynamic routing which is based on exchanges of service messages by broadcasting.

These exchanges enable at least some of the stations making up the radio network, hereinafter referred to as mobile stations, to acquire an at least partial knowledge of the topology of the network at each instant. The aforementioned patent application also describes a jump by jump routing mechanism between the stations suitable for relaying, amongst the hybrid and mobile stations, in which each message, whether it contains service information or data, is encapsulated in a specific frame containing the address of the sources of the said message and a certain number of intermediate destinations, enabling the said message to be routed to its destination or destinations.

According to the standards, the stations are in fact not necessarily all suitable for relaying. This is notably the case in the HIPERLAN standard, where only the stations of the "forwarder" type are arranged for this.

Because of the frequent movements of the mobile stations in the network, it may sometimes be difficult for one of them to communicate with another mobile station which is distant and/or inaccessible because of an obstacle.

The ETHERNET (registered trade mark) random access cabled network, which is governed by the standard known as IEEE 802.3, can be used in the application described above. It uses a management protocol of the multiple access type sensitive to the carrier with collision detection, better known under the acronym CSMA/CD, standing for CARRIER SENSE MULTIPLE ACCESS WITH COLLISION DETECTION. However, other cabled network formats can be envisaged, such as for example the ISO standard for IEEE 802.5.

The object of the present invention is notably to use segments of at least one ancillary network of a given communication protocol (transit network) in order to locally and temporarily convey frames sent by one or more other main networks, notably radio networks, with different protocols. The "transit" network can be of the cabled type, such as for example the ETHERNET type or "FDDI", or "token ring", or also of the radio type. As for the main radio network, this can notably be in the format of the "HIPERLAN" standard, or in the format of IEEE 802.11.

The aim is therefore to facilitate the transmission of messages between mobile stations in a radio network. In order words, one or more networks (or network segments), radio and/or cabled, can be locally and momentarily used as gateways or short-cut in order to enable a mobile station in a radio network to communicate with another mobile station in the same radio network when communication between these stations is difficult or impossible or the number of mobile relays necessary for the transmission of a message is too great.

To do this, the present application proposes stations known as hybrid (Hi) (i=1 and 2 in FIG. 1) connected to segments 1, 2 in a cabled network, as illustrated in FIG. 1. The word hybrid means that the station can dialogue with networks with different protocols (or formats).

Such a cabled network comprises initially a multitude of units or stations S which transmit messages to each other via the cable segments 1 and 2 using a known cable-format protocol.

The hybrid stations H according to the invention are consequently either conventional units or stations S in which a connection device according to the invention has been installed, or special units or stations designed specifically.

Such hybrid stations H are not necessarily fixed. It may be a case of mobile stations able to be connected to a segment of the cabled network. These hybrid stations belong to the radio network, and form, with the cabled network segments, a "radio network extended over the cable". The radio network (or wireless network) comprises, as indicated previously, a multitude of mobile units or stations Mj (j=1 to 3 in FIG. 1), able to exchange with each other, according to a radio protocol based on a radio format, data frames or service message frames of the type illustrated in FIGS. 3A and 3D.

The frame (or message) illustrated in FIG. 3A comprises first of all data referenced DATA, as well as a certain number of codes and/or fields whose definitions are given below, and which are grouped together in a "header".

ADI designates the address of the intermediate destination of the data (DATA). ASI designates the address of the last intermediate source which relayed the frame. CIR is an information field of the radio network containing the type of information contained in the frame received and the number of this frame (or sequence number); this field makes it possible to determine whether the frame has already been received and processed by the receiving station. AD designates the address of the final destination or destinations of the frame. AS designates the original source (it is a case in fact of the mobile station M which generated the frame). CI is a residual information field. CP is a higher protocol code for designating the layer (or level) for which the data or service message contained in the frame are intended.

It should be stated here, although this is perfectly well known to a person skilled in the art, that the units or stations in a network are provided with network interfaces defined "by layer or level" (ISO standard), to each of which there is allocated a predetermined function. Such a division into functional layers or levels makes it possible to ensure compatibility between components of the network with different sources when they are connected. In the following, the protocol layers strictly speaking, and the higher layers of the protocol, will be distinguished. Higher layers of the protocol means specific operations which take account specifically of the nature and conditions applicable to the transmission of data between stations, via the network, whether it is cabled or radio. On the other hand, the layers of the protocol will on the contrary govern the transmission of data with regard to its basic conditions, so that the security of this transmission can be ensured.

Figure 3A:
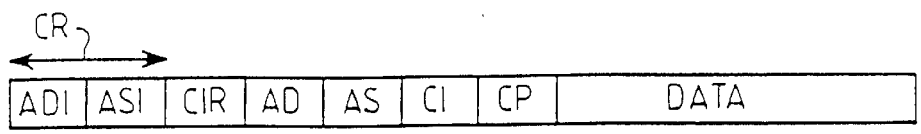
FIGS. 3A to 3E illustrate examples of formats of respectively data frames in a radio network, data frames in a conventional cabled network, data frames in a radio network encapsulated for a cabled network, service frames for monitoring the environment of a radio network, and service frames for monitoring the environment of an encapsulated radio network for a cabled network.

A frame such as the one illustrated in FIG. 3A is normally said to be encapsulated because of the presence of two address codes (ADI and ASI) which form what is referred to as a "radio capsule CR" (main capsule).

Figure 3B:
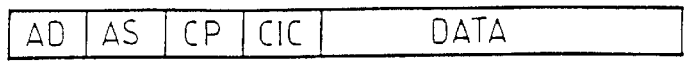
Figure 3C:
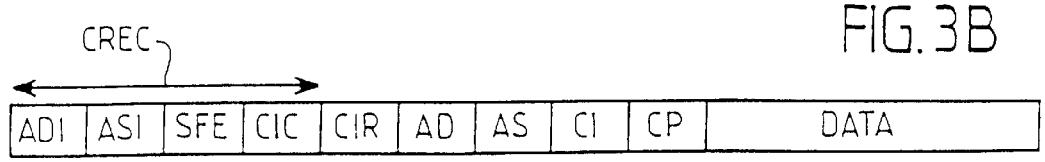
Figure 3D:
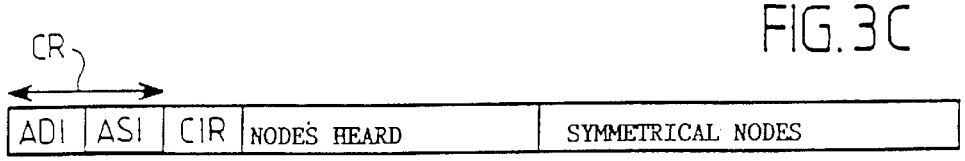

A service frame (or service message) of the type illustrated in FIG. 3D generally comprises fewer codes and/or fields than a data frame, in so far as it contains only service information relating to the relationships between the mobile stations in the network. In the example illustrated, the service frame is intended to allow monitoring of the environment of the nodes in the radio network. Such a frame comprises, like all the frames circulating in the radio network, the radio capsule CR composed of the address codes ADI and ASI, as well as an information field on the radio network CIR. More details will be given later on this type of service frame.

Likewise, in a conventional cabled network (ancillary network), the stations S exchange messages comprising encapsulated data according to a cable protocol based on a cable format. The messages are therefore encapsulated in the form of a frame including, as illustrated in FIG. 3B, data (referenced DATA) the field AD, the field AS, the field CP, and a field specific to the cabled which forms the cable capsule (or ancillary capsule), which is an information field representing for example the type of information contained in the frame and the number of the frame (sequence number).

This information field CIC which forms the ancillary cable capsule is the equivalent of the field CIR in a given radio frame Some current cabled networks can, when some of their fixed station s are equipped for this purpose (for example with an antenna), receive a radio frame, provided with its radio capsule CR, and transmit it to another fixed station in this same cabled network. However, in these current networks, it is not possible to use routing information contained in a radio frame so as to optimize the transmission of the message which it contains. In other words, it is not possible to receive a radio frame at a first station to use one or more segments of the cable network to reach another fixed station S, and then to re-send the radio frame by means of this fixed station in the direction of the mobile station M which is the destination of the message contained in the radio frame.

The purpose of the connection device according to the invention is therefore to allow such an optimized transmission via a cabled network, or else via another radio network not having the same radio protocol as that of the message sent.

Such a connection device, which is for example located in a hybird station Hi, connected to the cabled network, must therefore be capable of receiving the radio frames from the network which it interfaces in order to check whether these frames relate to it, and then to extract therefrom routing information allowing updating of the routing information which are stored in one of its memories, and/or to determine one or more hybrid relay stations in the cable network making it possible to route, as rapidly as possible, the frame received in the immediate vicinity of the mobile station or stations Mj which are the destinations of the message sent by the initial mobile station (the generator of the message or frame).

To do this, the connection device according to the invention comprises (see FIG. 2) a cabled network interface 3 directly connected to a segment of the cabled network 1, a radio network interface 4 provided with a sending/receiving antenna intended to send and receive frames (or messages) according to the appropriate radio protocol, a storage module 5 in which there is stored at least one routing table 6 in the form of digital data, and a processing module 7 intended to manage the exchanges of data or service messages at the network interfaces, according to the routing table 6, at least.

In the example illustrated, the processing module 7 comprises the storage module 5.

Each network interface 3 and 4 preferably comprises a receiving module 3a, respectively 4a, intended to collect the frames coming from the network to which it is "connected", and a transmitting module 3b, respectively 4b, intended to transmit a frame in the format of the network to which it is "connected".

Cabled network interface means here an interface used conventionally in a cabled network. On the other hand, a radio network interface here means anything which is situated between the processing module 7 of the connection device and the sending and receiving antennae.

In addition, "frame" (or "packet") means here an elementary data transmission unit, or in other words a unit comprising a certain number of data which can be transmitted together. A "message" generally designates a set of data to be transmitted, of any size. In other words, the data in a message can be distributed in several frames which follow each other.

By way of example, the cabled network interface can be formed by a connection standardized by the standard IEEE 802, such as the one produced by means of an 86960A integrated circuit sold by the company FUJITSU.

The data (or message) contained in a frame are intended for one or more other mobile stations in the radio network to which the sender of the frame belongs, or more simply for one or more hybrid stations Hi, which constitute an extension of the radio network, or both to mobile stations Mj and to hybrid stations Hi.

The processing module 7 of the connection device according to the invention, which is located in a hybrid station H, is connected to a so-called "higher" level of the said hybrid station. This higher level, which could be a "level 3" (or higher) within the meaning of the OSI model, is produced in the form of a module 8 capable of analysing the data contained in the message, or of generating a message in the direction of the processing module 7 so that this message, and consequently of the data which it comprises, can be transmitted via the cabled network 1 and/or via the radio network.

Here, the network interfaces 3 and 4 constitute the level (or layer) 1, whilst the processing module 7 constitutes the level (or layer) 2. There is thus established a kind of hierarchy between levels, each level having a particular functionality which increases in going towards a higher level, and consequently in approaching the raw data (DATA) to be analysed.

Figure 2:
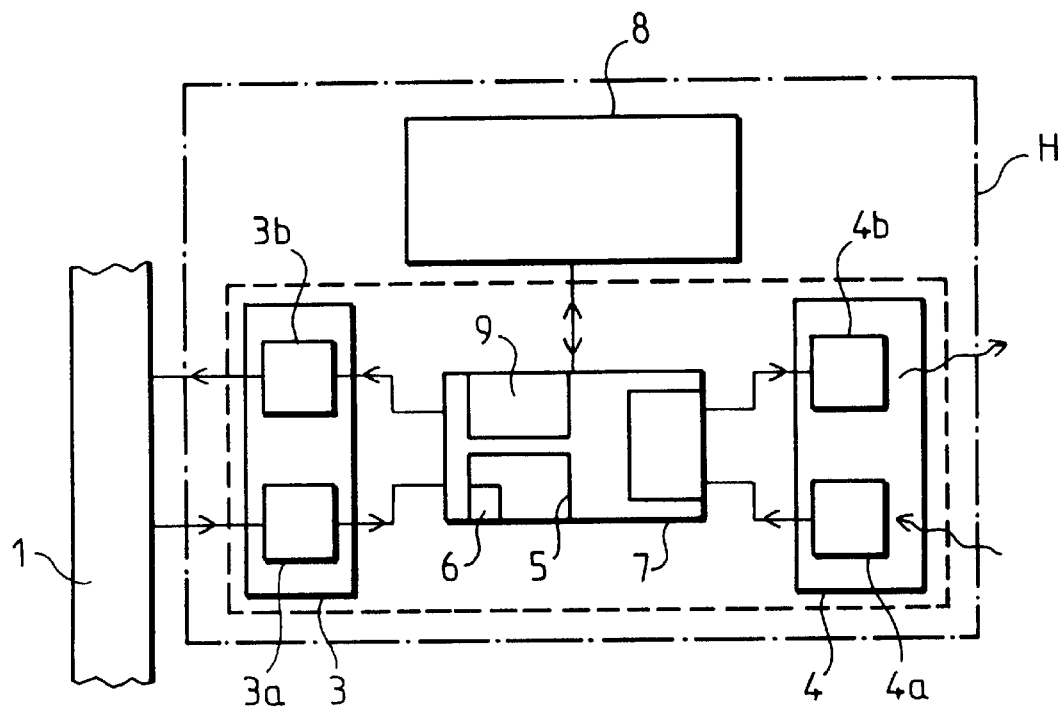
FIG. 2 is a highly simplified diagram illustrating a hybrid station according to the invention.

Reference is now made to FIGS. 4 to 11 in order to describe the frame processing mechanisms used by a connection device of the type illustrated in FIG. 2 and located, solely by way of example, within a hybrid station H connected to a cabled network.

The purpose of the connection device according to the invention is to allow the free circulation, without hindrance or modification, of the frames in the format of the cable in the cabled network, and the circulation between hybrid stations connected to the segment 1 and 2 of the cabled network of modified (re-encapsulated) frames coming from the radio network.

In order to arrive at such a result, the connection device is arranged to put a frame received (here either from the cabled network or from the radio network) in the format of the network which will route the frame received at the following mobile or hybrid relay station, and so on until the frame reaches its destination (a mobile station M).

The processing module 7 of the connection device according to the invention comprises for this purpose a management module 9 which, on reception of a frame, effects thereon, if the information relates to it, a disencapsulation in order to extract therefrom the data or the service message and/or routing information which will enable it to determine the next mobile and/or hybrid relay station or stations and consequently the network or networks for re-sending the frame.

When the management unit 9 determines, in the codes and fields contained in the header of the frame received, that the message is intended notably for the hybrid (host) station in which it is located, it transmits the data contained in this disencapsulated frame to the higher layer (or level 3 in general) 8 of the hybrid station H with a view to their use or processing. When the management module 9 for a hybrid station H determines that its host station is not the sole destination of the message, or else that the message received must be relayed in the context of a broadcasting (multipoint processing) or in the context of a processing of the "point-to-point" type, which will be dealt with again later, it re-encapsulates the message in the format of the re-sending network or networks which it has chosen on the basis of an interrogation of the routing table and an analysis of the address fields and codes contained in the header of the frame received, and then addresses the re-encapsulated frame to the interface or interfaces 3 and/or 4 to which the re-sending relates.

Preferably, the re-encapsulation of a message received includes the addition, to the frame received, of a protocol code SFE which designates the (main) radio network to which the mobile station which sent the frame belongs.

Such a re-encapsulated data frame is illustrated in FIG. 3C. This frame comprises all the codes and fields of a standard data frame of the radio network (ADI, ASI, CIR, AD, AS, CI, CP), as well as the protocol code SFE which indicates that the message comes from the radio network, and an information field specific to the cabled network CIC which forms the (ancillary) cable capsule of the frame, so that the said cabled network can route the re-encapsulated frame at another hybrid station.

FIG. 3C depicts a data frame received by a hybrid station H, and then re-encapsulated so as to use a segment of the cabled network. In this re-encapsulated data frame, the codes ADI, ASI, SFE and CIC form what is called hereinafter the mixed capsule or the radio capsule extended to the CREC cable. In order words, the mixed capsule is formed by the "juxtaposition" of a (main) radio capsule and an (ancillary) cable capsule.

Figure 3E:
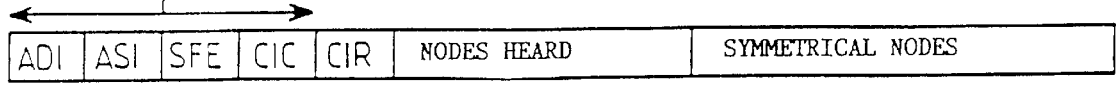

FIG. 3E also illustrates a service frame (or message) re-encapsulated so as to be able to pass via the cabled network, so as to join one or more hybrid stations Hi.

Figure 4:
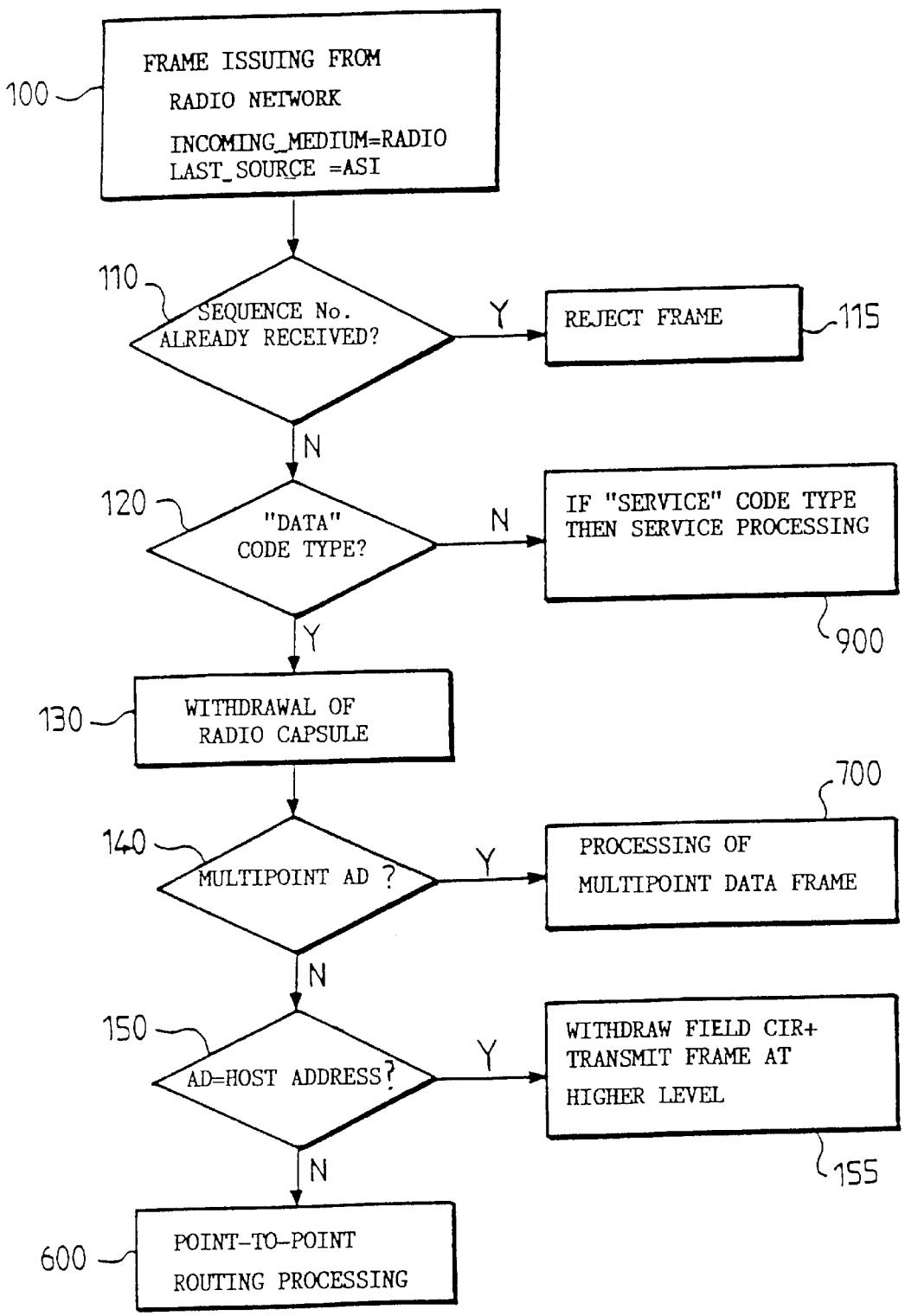
FIG. 4 is an outline block diagram illustrating the main steps of processing a frame received from a radio network.

FIG. 4 depicts an outline block diagram illustrating the main steps of processing a frame received from a mobile station M in the radio network, and intended either for one or more other mobile stations of the radio network or for one or more hybrid stations H connected to cabled network segments connected together, or to mobile and/or hybrid stations.

The frame issuing from the radio network is received by the reception module 4a of the radio network interface 4, which then transmits it to the processing module 7, and more precisely to its management module 9, after checking its format. In a first step 100, the management module places a variable "incoming_medium" at the value "radio" so as to note where the frame received comes from, and puts a variable "last source address" at the value of the address field of the intermediate source ASI, which is the address of the last station which sent the message. Then, preferably, in a step 110, the processing module 9 analyses the content of the radio information field CIR so as to check whether the frame (or sequence) number which it contains corresponds to a frame already received.

Advantageously, and although this is not obligatory, if the frame has already been processed, and consequently if the test is positive, the frame is then rejected. This constitutes step 115, which ends the processing of the frame. On the other hand, if the result of the test is negative, the processing module 9, in a step 120, carries out a second test relating to the contents of the address fields AD, AS and residual information field CI, and of the higher protocol code CP which designates the layer to which the data of the frame relate, with a view to determining whether the frame received contains data or a service message.

Figure 9:
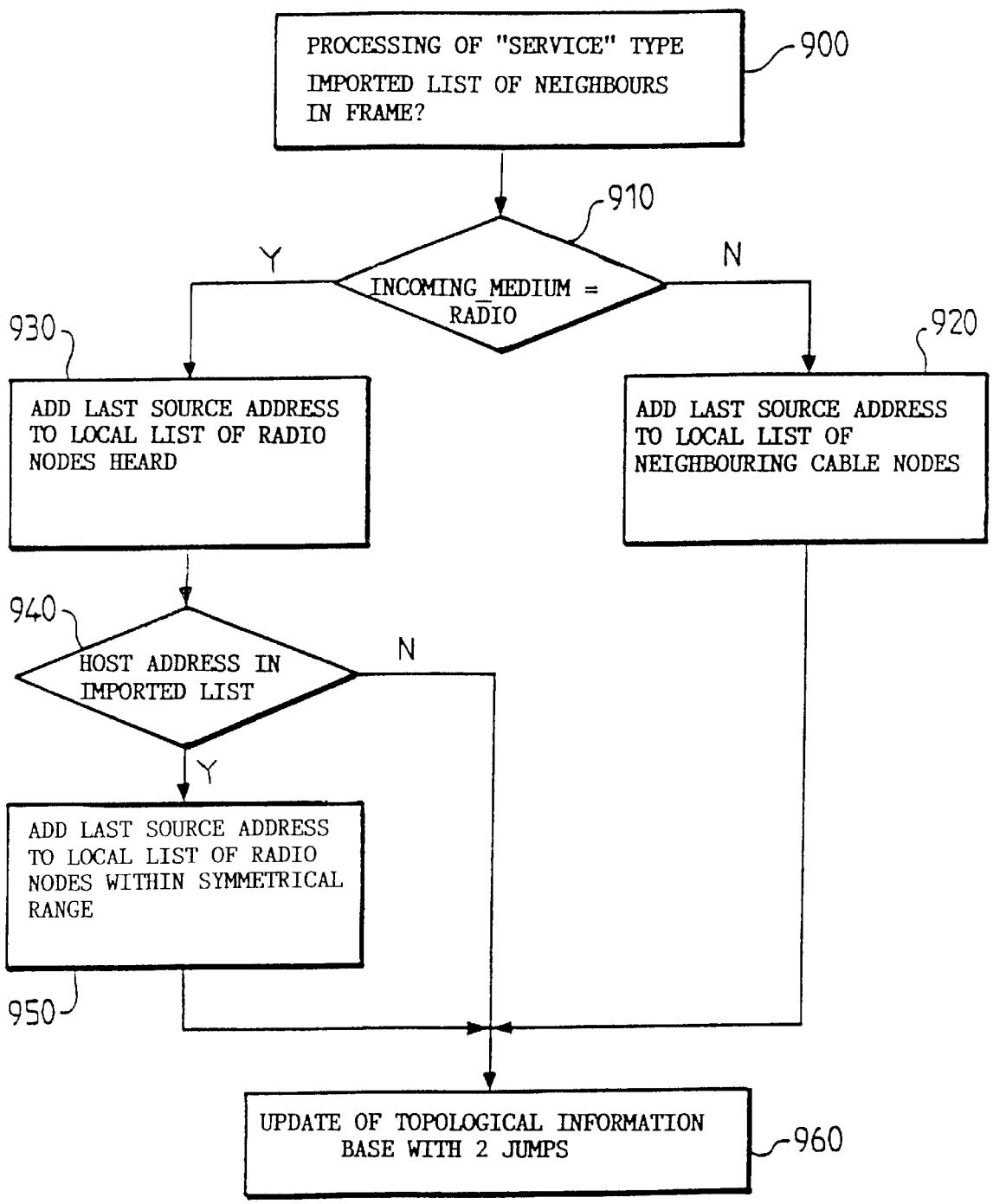
FIG. 9 is an outline block diagram illustrating the main steps of processing service frames associated with monitoring of the environment.

If the frame contains a service message, the result of the test is therefore negative and the management module passes to a step 900 of processing the service message, which will be dealt with later with reference to FIG. 9. On the other hand, if the frame contains data, that is to say if the test is positive, the management module 9, in a fourth step 130, withdraws the (main) radio capsule CR, or in other words withdraws the address fields of the intermediate destination ADI and of the intermediate source ASI, the latter in fact comprising the address of the last station which sent the message.

In a step 140, the management module 9 carries out a third test relating to the content of the address field of the final destination of the frame AD. In fact, this test consists of determining whether the frame received must be broadcast (multipoint data) since it concerns several mobile and/or hybrid units or stations, or whether it concerns only a single station and consequently contains so-called point-to-point data.

If the result of the test at step 140 is positive, the management module 9, in a step 700, which will be described below with reference to FIG. 7, processes the multipoint data frame so as to enable it to be broadcast. On the other hand, if the result of this third test is negative, the management module, in a step 150, carries out a fourth test relating directly to the content of the field AD so as to determine whether the hybrid station H in which it is located (the host station) is the destination of the frame, or whether this host station is only a relay station allowing a point-to-point routing in the direction of another hybrid station or a mobile station M of the radio network.

If the result of this fourth test is positive, and consequently the hybrid station H is the destination of the data contained in the frame received at step 100, the management module 9, in a step 155, withdraws the radio information field CIR, and then transmits the frame at the higher level 8, for example, of the hybrid station in which it is situated, of the frame for the purpose of processing the remaining information which it contains. The transmission is to the layer corresponding to the protocol code of the packet.

On the other hand, if the result of this fourth test is negative, the management module 9, in a step 600 which will be described later with reference to FIG. 6, carries out the point-to-point routing processing of the frame, in order to relay this and consequently to bring it closer, in an optimized fashion, to the destination hybrid or mobile station.

Figure 5:
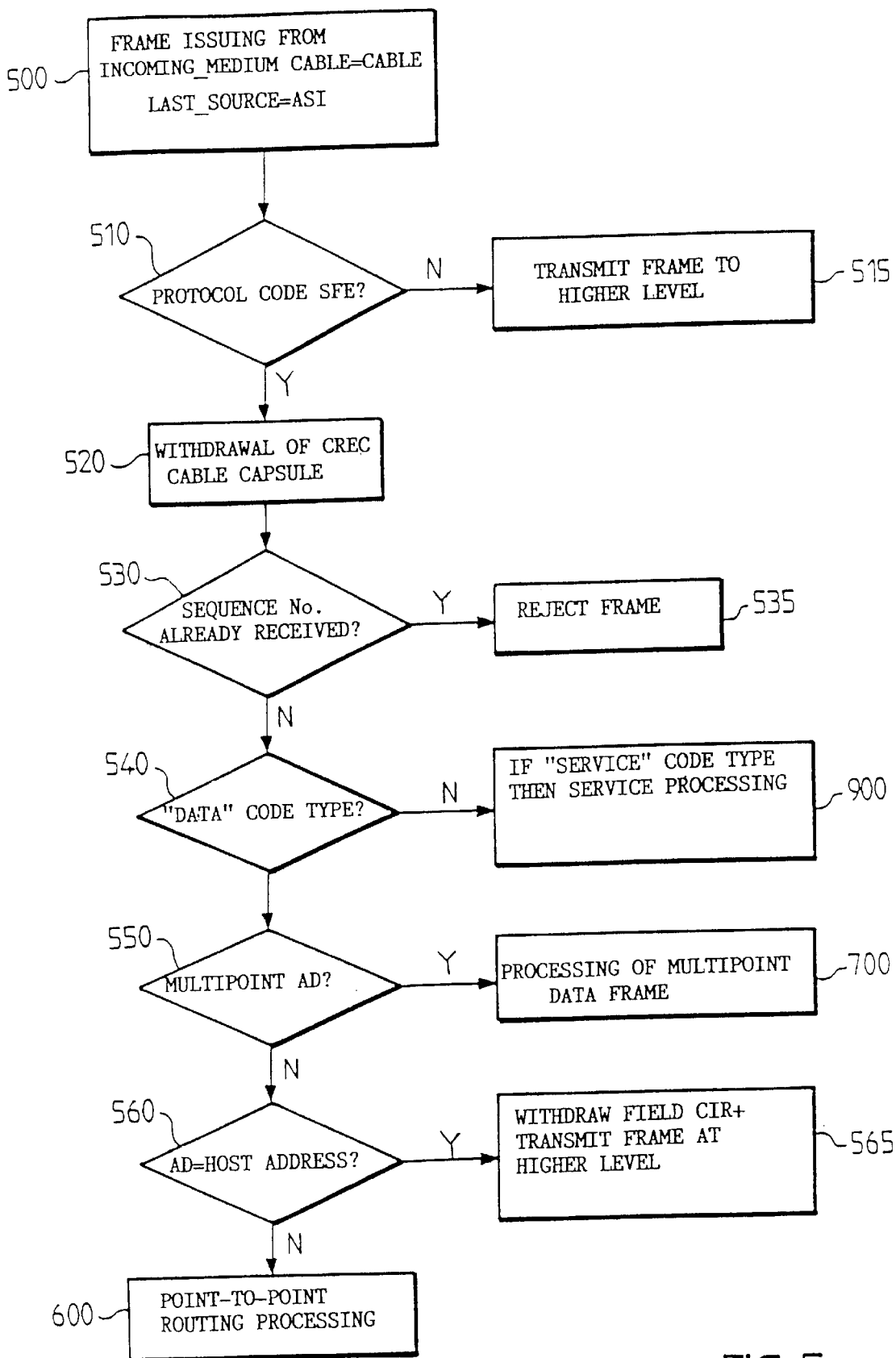
FIG. 5 is an outline block diagram illustrating the main steps of processing a frame received from a cabled network.

Reference is now made to FIG. 5 in order to describe the processing of a frame received from the cabled network. In this regard, a frame is received by the reception module 3A of the cabled network interface of a hybrid station H. This interface 3 transmits the frame to the processing module 7, and more precisely to its management module 9.

In a step 500 the frame is therefore received by the management module 9, which sets the variable incoming_medium to the value "cable" indicating that the message received comes from the cabled network, and sets the variable "last source address" to the value of the address field of the intermediate source ASI.

Then, in a step 510, the management module 9 performs a first test intended to determine whether the protocol code SFE indicating that the frame received was sent initially by the radio network (the main network), is present. If the result of this test is negative then, in a step 515, the management module transmits the frame to the higher level 8 of the hybrid station, with a view to the processing of the data which it contains. When the result of the test of step 510 is positive, that is to say when the frame contains the protocol code SFE, then, in a step 520, the management module withdraws the radio capsule encapsulated in the cable format CREC (mixed capsule).

Then, in a step 530, the management module 9 performs a second test relating to the content of the radio information field CIR, and notably on the number of the frame (or sequence number), so as to determine whether this is has already been received and therefore processed. If the result of this second test is positive, that is to say if the frame has already been processed, then the management module advantageously, in a step 535, although this is not obligatory, rejects the frame received. On the other hand, if the result of this second test is negative, the management module 9, in a third test, pursues the analysis of the specific information contained in the field CIR, so as to determine whether the information which the received frame contains is data or forms a service message. When the result of this third test is negative, that is to say if the frame contains a service message, then the management module 9 passes to step 900. On the other hand, if the result of this third test is positive, then, in a step 550, the management module 9 carries out the analysis of the address field AD (address of the final destination) so as to determine whether the frame must be broadcast (multipoint processing) or whether it is a case of a frame to be relayed in a single station (point-to-point processing).

When the result of this fourth test is positive, that is to say when it is a case of a frame to be broadcast, the management module 9, in a step 700, carries out the multipoint processing. On the other hand, when the result of this fourth test is negative, the processing module 9, in a step 560, carries out a fifth test also relating to the address field AD, so as to determine whether the address of the destination of the frame is that of the hybrid station in which it is located.

In the exceptional case where the routing table does not contain the information necessary for relaying, it would in certain variants be possible either to reject the frame which cannot be relayed or to relay this frame to another relay station chosen in an arbitrary fashion, or again to effect a relaying by broadcasting in which the message would be processed in the same way as a message for broadcasting, for example by forcing it to pass through step 700.

If the result of this fifth test is positive, then the management module 9, in a step 565, withdraws the radio information field CIR, and then transmits the remainder of the information contained in the frame at the higher level 8, with a view to the processing of the data which it contains. On the other hand, if the result of this fifth test is negative, the processing module passes to step 600 with a view to a processing of the data of the point-to-point type.

The protocol code SFE enables a connection device according to the invention to recognize that a frame which is circulating in the cabled network has come from the radio network and not that it is a case of a conventional frame of the cabled network.

Figure 6:
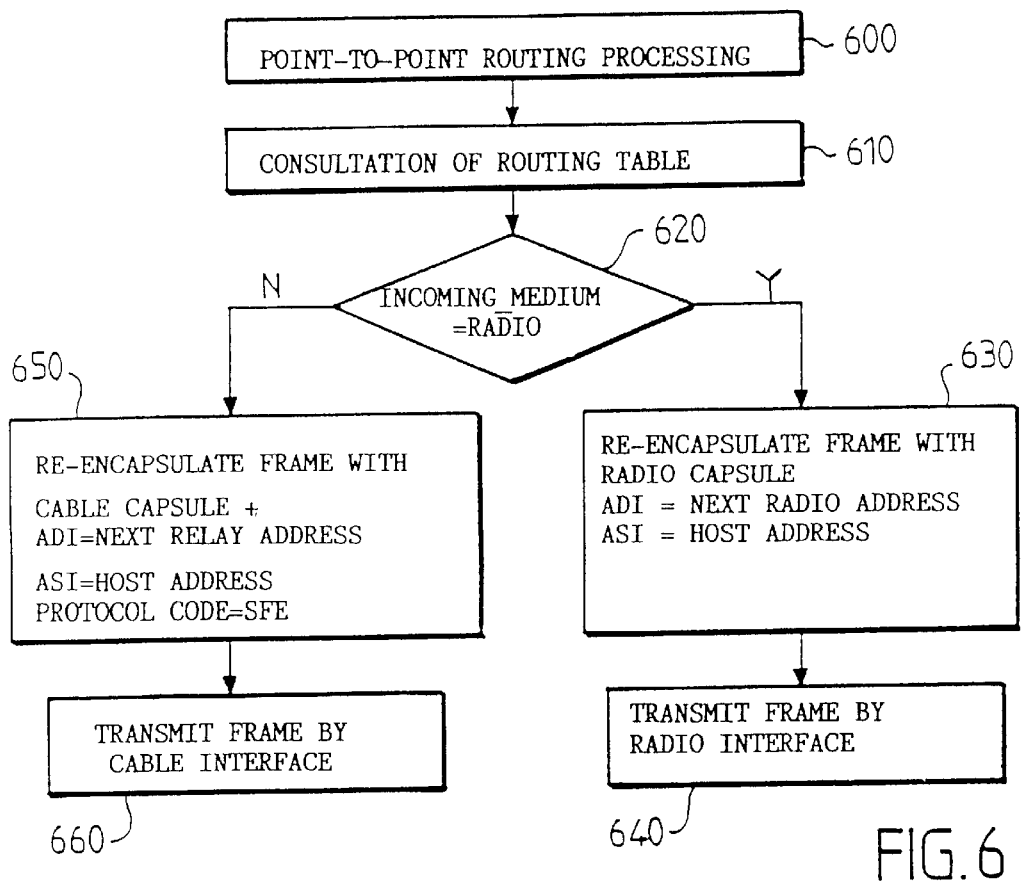
FIG. 6 is an outline block diagram illustrating the main steps of processing point-to-point routing.

Reference is now made to FIG. 6 in order to describe the main steps of processing of the so-called "point-to-point" routing (step 600 in the above).

As indicated previously, the processing module 7 of the interconnection device according to the invention comprises a routing table 6 stored in a storage module 5. Such a routing table can consist of predetermined information stored at the time of manufacture of the connection device. However, it is preferable for such a routing table to be able to be updated continuously. Such an updating can be effected from information contained in the header of the frames received, given that each of them includes an indication of its immediate sender, which enables it to continuously maintain a table of the adjacent hybrid and mobile units or stations. In addition, the mobile stations M of the radio network generally send spontaneous frames which broadcast to the other mobile stations within its radio range at least some of the content of their personal routing table (the stations which they are receiving).

Thus each mobile station can autonomously know the hybrid and mobile stations which it receives and, through the transmitted information, the hybrid and mobile stations which receive it. Two registers can thus be constructed at each mobile station, a sending register which comprises the stations which the station hears and a reception register which comprises the stations which are heard by the station.

It is clear that a hybrid station constitutes a station of the radio network. Consequently, it is important for its routing table to be complete and up to date, in the same way as that of the mobile stations suitable for relaying so that the determination of the relays is optimized at the time of transmission of a message encapsulated for cable.

Knowing the stations which are heard and those which hear, it is possible to determine the stations which are within symmetrical range. However, it is particularly advantageous for the routing, whether it is of the broadcast or point-to-point type, to take place using relay stations which check this symmetrical range condition. A given station can thus communicate directly (by a single transmission) with its homologues within symmetrical range, or indirectly (by other transmissions) with other units or stations within symmetrical range of the first units, which will then serve as relays, and so on. It is then possible to calculate the number of jumps necessary for a station to reach another station. This number of jumps is preferably limited.

Knowing the number of jumps necessary for a station in order to communicate with other hybrid and/or mobile stations, it is possible to construct a new table which is referred to as a "topological directory", preferably at each hybrid and mobile station or unit. Such a directory is in the form of a rectangular matrix or a matrix with two inputs, for example on the columns the number of certain stations (for example only those of the so-called "forwarder" type under the HIPERLAN standard), contained in the transmission register (those which directly receive the station concerned), and as ordinates the numbers of all the stations which are accessible from the station concerned, and not only those within direct symmetrical range. This routing technique is referred to as "distance vectors" routing. Each cell in this directory (or matrix) then contains the number of jumps necessary to reach the station aimed at, that is to say the destination of the message contained in the frame. As an alternative, the topological directory can contain information on the state of the direct links between each of the pairs of stations (or units) in the network. This technique is referred to as the "state of the links" techniques.

The updating of the routing table of each of the hybrid and mobile stations is therefore particularly interesting, in so far as it can allow the updating of the topological directories in the hybrid stations and in certain mobile stations within radio range.

Such updating can be effected by examining the codes contained in the received frame, notably the address of the intermediate source (ASI), the address of the original source (AB) and the number of jumps already made by the frame if the latter is mentioned in a field CIR.

Alternatively, but without for all that excluding what has just been stated, the updating of the topological directories can be effected by means of specially dedicated service messages, of the "topology monitoring" type, sent preferentially by diffusion mode by certain hybrid or mobile stations. These messages can contain, for a given station, a list of stations able to relay their messages and preferably chosen from amongst the stations which are within its range symmetrically. These service messages will be particularly useful for routings of the so-called "state of the links" type.

Another possibility, which does not exclude the previous one, consists of ensuring that these service messages contain information on the number of jumps to other stations in the network. These service messages will be particularly useful for routings of the so-called "distance vector" type.

In the context of IEEE 802.11, where a hybrid station is identified with an access point, the exchange of service messages enables the access points to acquire topological information on all the mobile stations and hybrid stations, so as to allow effective management of the distribution system. Where the distribution system is also of the wireless type, the invention therefore makes it possible to manage this distribution system from the access points by re-using, at least partially, radio functions peculiar to the basic service set BSS, using the English terminology in IEEE 802.11.

When the management module 9 has determined, either during a step 560 or during a step 150, that a processing of the point-to-point type must be applied to the frame received, it triggers the point-to-point processing of step 600. Then, during a step 610, it consults at least its routing table in order to determine the address of the next relay, the most appropriate for the optimized routing of the frame at the destination station. This optimization can be effected on one or more criteria relating to the characteristics of the main and ancillary networks, other than the one relating to the number of jumps, such as for example the quality of the links, or the capacity of the links, or the availability of the links. By way of example, priority could be given, for an equal number of jumps, to a transit over the cabled network rather than over the (main) radio network, because of the greater capacity of the cabled networks in general. It is clear that this determination of the next relay (hybrid station or mobile station) also provides the type of network (radio or cabled) in which the frame will be re-sent since this information is preferably stored in the form of a pair in the memory 5.

Once this determination has been made, the management module 9 performs, in a step 620, a first step relating to the type of re-sending network. In other words, this test consists of determining whether the re-sending network is or is not the radio network (in this example). When the result of the test is positive, that is to say if the re-sending network is the radio network, then the management module 5, in a step 630, re-encapsulates the frame by adding to it the radio capsule CR (address codes ADI and ASI), the code ADI comprising the address of the next relay determined at step 610, and the code ASI containing the address of the hybrid station H in which it is located. It is not necessary to add the protocol code SFE since re-sending is taking place in the radio network. Then, in a step 640, the processing module 7 addresses the frame re-encapsulated at step 630 to the sending module 4*b* of the radio network interface 4, so that this re-encapsulated frame is re-sent in the radio network in the direction of the next relay (here a mobile station M).

When the result of the test carried out at step 620 is negative, that is to say when the re-sending network is the cabled network, the management module, in a step 650, re-encapsulates the frame by adding to it a radio capsule encapsulated in the cable format CREC (codes and fields ADI, ASI, SFE, CIC) (mixed capsule). The code ADI comprising the address of the next hybrid relay on the cabled network, the code ASI indicating the address of the host hybrid station on the same network, and the protocol code SFE indicating that the frame initially comes from the radio network. Then, in a step 660, the processing module 7 transmits the re-encapsulated frame to the sending module 3*b* of the cabled interface network 3 with a view to its sending in a segment 1 or 2 of the cabled network in the direction of the hybrid station chosen as the next relay at step 610.

Figure 7:
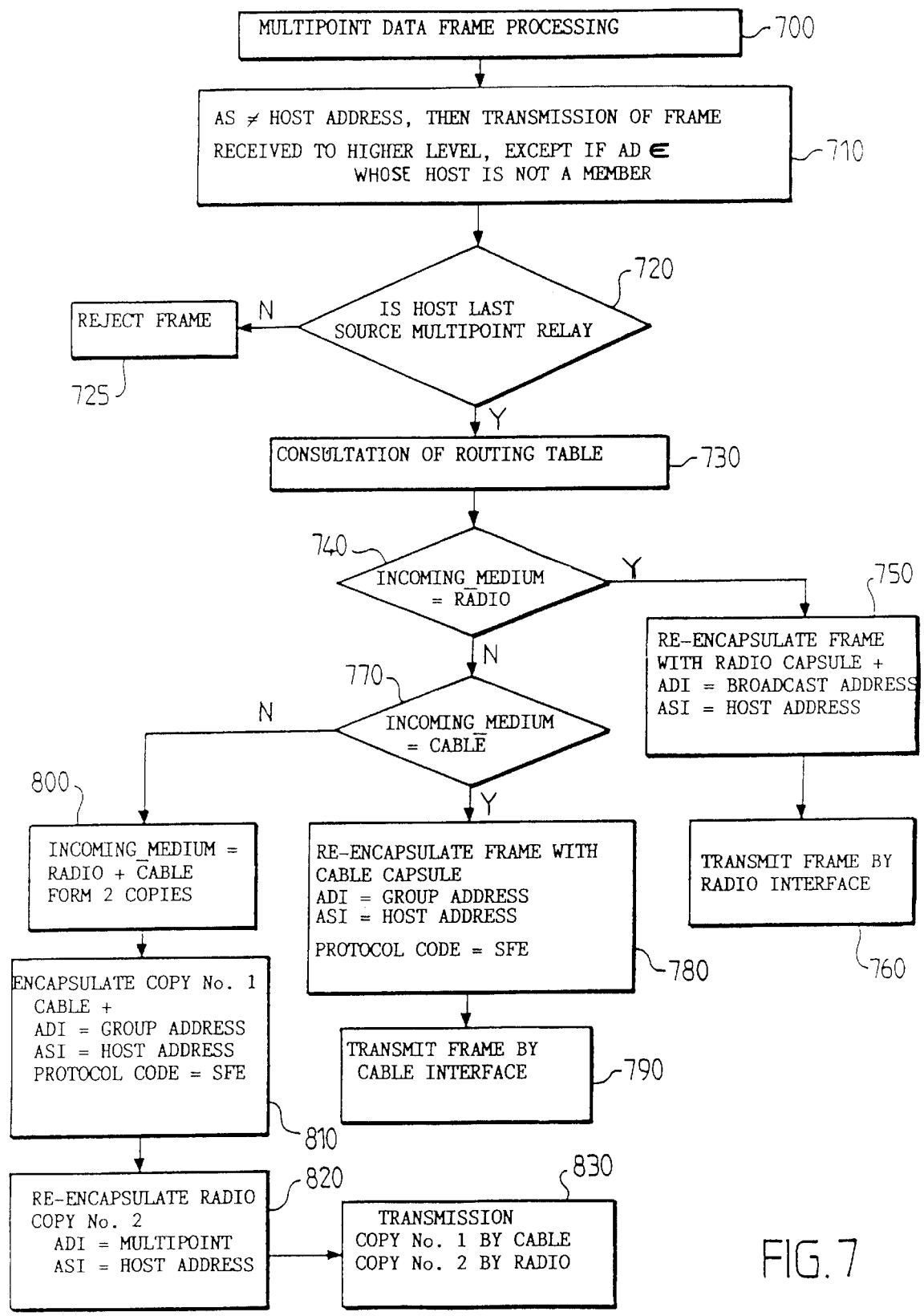
FIG. 7 is an outline block diagram illustrating the main steps of processing multipoint data frames.

Reference is now made to FIG. 7 in order to describe the processing of a frame by broadcasting (or multipoint data processing).

Such a processing is decided by the management module 9 of a hybrid station H following either the test carried out at step 140 or the test carried out at step 550. In fact, it consists of determining the best way of causing a frame to reach several hybrid and/or mobile stations.

To do this, the management module, in a step 710, analyses the address fields AS and AD contained in the header of the frame received. If the address of the source (AS) is not the same as the host address (that of the hybrid station in which the management module 9 is situated), then the said management module 9 delivers a copy of the frame received to the higher level 8 of the hybrid station which corresponds to the protocol code CP. This operation is performed if and only if the code AD does not designate a group of hybrid stations Hi of which the host is not a member. To this end, the hybrid stations connected to the cabled network are grouped together in groups having the same group address. All the hybrid stations connected to the same cabled network can for example have the same group address, but this is not obligatory.

In all other cases, the management module 9, in a step 720, carries out a first test intended to determine whether the hybrid (host) station in which it is located is of the "last source relay multipoint" type (it is then a case of the multipoint relay of the sender designated by the variable last source_address). It is interesting to note here, and this will be developed later, that the multipoint relay corresponds to an optimization which is not essential. By default, each station able to relay can be considered as a multipoint relay of a given station. If the result of this first test is negative, then the management module 9 decides, in a step 725, to reject the frame received. On the other hand, if the result of this first test is positive, then the management module, in a step 730, determines the network or networks for re-sending the frame to be broadcast. This determination is effected by a consultation of at least the routing table. The management module 9 then, in a step 640, carries out a second test intended to determine whether the determined re-sending network is the radio network.

If the answer is affirmative, then the management module 9, in a step 750, re-encapsulates the frame received by adding the radio capsule CR (composed of the fields ADI and ASI), the field ASI comprising the address of the host hybrid station, and the field ADI comprising, preferably, a broadcasting address of the radio network, or alternatively, if the radio format so allows, several addresses of hybrid H or mobile M stations which are to continue the broadcasting of the re-encapsulated frame. Then, in a step 760, the processing module 7 transmits the re-encapsulated frame during step 750 to the re-sending module 4b of the radio network interface 4 with a view to re-sending this re-encapsulated frame over the ether (communication medium of the radio network).

On the other hand, if the result of the second test is negative, that is to say if the determination effected at step 730 has ended either in the determination of a single cabled re-transmission network, or at the same time in the cabled transmission network and radio transmission network, then the management module 9, in a step 770, carries out a third test intended to determine whether only the cabled network has been chosen as the re-transmission network.

If the result of this third test is positive, that is to say if only the cabled network has been chosen as the re-transmission network, then the management module, in a step 780, re-encapsulates the frame by adding a radio capsule encapsulated in the cable format CREC (composed of the codes and fields ADI, ASI, SFE, CIC) (mixed capsule), the code ADI preferably comprising the group address of the hybrid stations connected to the cabled network, the code ASI comprising the address of the host hybrid station, and the protocol code SFE indicating that the message contained in the re-encapsulated frame has come from the radio network and therefore does not concern the conventional stations S of the cabled network. Then, in a step 790, the processing module 7 transmits the frame re-encapsulated at step 780 to the sending module 3b of the cabled network interface 3 with a view to sending this frame re-encapsulated in a segment of the cabled network, in the direction of the hybrid stations designated by the group address.

On the other hand, if the third test performed at step 770 is negative, that is to say if the cabled network and the radio network have both been chosen as the re-transmission (or re-sending) networks at step 730, then the management module, in a step 800, forms two copies of the frame. Then, in a step 810, the management module 9 re-encapsulates one of the two copies of the frame by adding the radio capsule encapsulated in the cable format CREC (codes ADI, ASI, SFE and CIC) (mixed capsule), the ADI code designating preferably the group address of the hybrid stations in the network, the code ASI designating the address of the host hybrid station, and the protocol code SFE indicating that the message contained in the frame came from the radio network.

In a step 820 the management module 9 then re-encapsulates the second copy of the frame by adding the radio capsule CR (codes ADI and ASI), the code ADI indicating that the transmission is of the multipoint (or broadcast) type, and the code ASI comprising the address of the host hybrid station.

Finally, in a step 830, the processing module 7 transmits the first copy re-encapsulated in the cable format to the sending module 3b of the cabled network interface 3 with a view to sending this copy No 1 in the cabled network in the direction of the hybrid stations designated by the group address, and copy No 2 re-encapsulated in the radio format to the sending module 4b of the radio network interface 4 with a view to sending it over the ether forming the communication medium of the radio network.

The interconnection device according to the invention can also, as indicated previously, process frames comprising service messages, such as for example messages containing an imported list of neighbors (hybrid stations or mobile stations). In order to describe such a processing, reference is now made to FIG. 9.

This type of processing is effected by the management module 9 following the tests carried out either at step 120 or at step 540.

After step 900, the management module 9,-in a step 910, carries out a first test intended to determine whether or not the network from which the received frame comes is the radio network (in other words an analysis is carried out of the variable incoming_medium whose value was fixed either at step 100 or at step 500).

When the result of this first test is negative, that is to say if the network which was used to route the frame at the hybrid station is not the radio network, then the management module 9, in a step 920, adds if necessary the address of the very last source station (the one which is contained in the field ASI not yet modified) to the local list of the adjacent nodes (or stations) by the cabled network. Then a step 960 is passed to directly, in which the processing module 7 effects an updating of the topological directory with two jumps, referred to previously.

On the other hand, if the result of the first test carried out at step 910 is positive, that is to say if the network which enabled the received frame to be routed is the radio network, then the management module 9, in a step 930, if necessary adds the address of the last intermediate source (the not yet modified field ASI) to the local list of the nodes (or stations) listened to by radio. Then the management module 9, in a step 940, carries out a second test intended to determine whether the host address (the address of the station in which it is located, is situated in the imported list contained in the frame received.

If the result of the second test is negative, step 960 is passed to directly. On the other hand, if the result of this second test is positive, then the management module, in a step 950, if necessary adds the address of the last intermediate source (field ASI not yet modified) to the local list of the nodes (or stations) within radio symmetrical range of the hybrid station concerned. Then the management module 9 goes to step 960.

Figure 11:
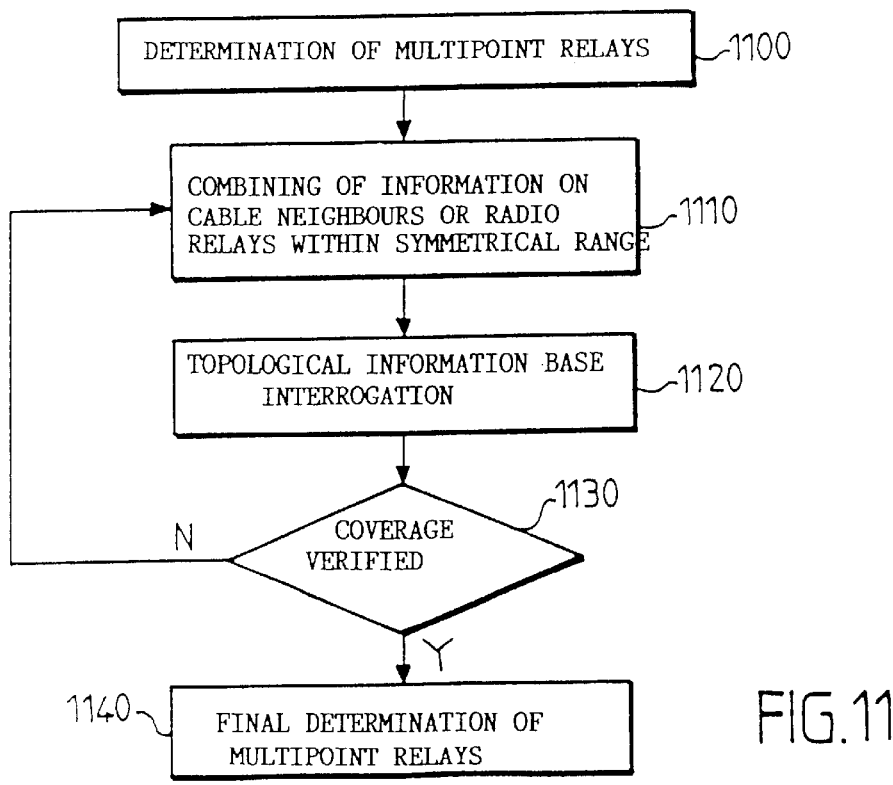
FIG. 11 is an outline block diagram illustrating the main steps of determining multipoint relays.

A description will now be given, with reference to FIG. 11, of the determination of the multipoint relays necessary for the first test carried out at step 720 during the processing of the broadcast (or multipoint) type.

The determination of the multipoint relays assumes a definite importance in the radio networks of the type described, in so far as it makes it possible to ensure an optimum broadcasting of the service messages, and consequently the updating of the different tables and registers. To do this, it is particularly advantageous for each hybrid and mobile station to have a broadcasting table in which there are stored the numbers (or addresses) of the hybrid and mobile stations (or units), preferably within symmetrical range, or else a subset of these stations verifying the following property: there is continuously a hybrid or mobile station in the broadcasting table enabling any one of the hybrid or-mobile stations in the radio network to be reached, or any one of the hybrid or mobile stations to which the broadcasting relates. This optimized selection of the multipoint relays is not necessary. It may in fact be preferred to choose that all the stations able to relay, or a given subset of these stations, can act as a multipoint relay of the host station.

Preferably, each hybrid or mobile station has a broadcasting list in which there are stored the broadcasting numbers (or addresses) of the stations which have allowed the broadcasting of the messages which reached the relevant hybrid or mobile station.

The determination of the multipoint relays is triggered in a step 1100 by the management module 9. Then, in a step 1110, the management module 9 determines, by means of its different tables, a subset of adjacent stations able to ensure the relaying of the service frame over the cable, or else of mobile stations within radio symmetrical range. This subset then forms a set of candidates for multipoint relay.

In a step 1120, the management module 9 then carries out an interrogation of the topological directory or directories so as to determine whether the hybrid and/or mobile stations or nodes situated at two jumps are adjacent to one of the candidate multipoint relay stations determined at step 1110.

Then, in a step 1130, the management module performs a test intended to determine whether the multipoint relay stations selected in steps 1110 and 1120 make it possible to broadcast the frames, or in other words whether the topological coverage is ensured. If the result of this test is positive, that is to say if the coverage is ensured, then the management module, in a step 1140, carries out the final selection of the multipoint relay stations. On the other hand, if the result of the test is negative, that is to say if the coverage is not ensured by the stations selected at steps 1110 and 1120, then the management module 9 returns to step 1110 so as to effect a new determination of relays adjacent to the cable or relays within radio symmetrical range. Steps 1110 to 1130 are consequently performed in loops until the result of the test at step 1130 is positive.

Preferably, the connection device according to the invention is capable, when it is located in a hybrid station, of transforming local data (or local messages) into frames which can be used by the mobile and hybrid stations. This shaping of the frames relates both to the frames containing data and the frames containing service messages.

Figure 8:
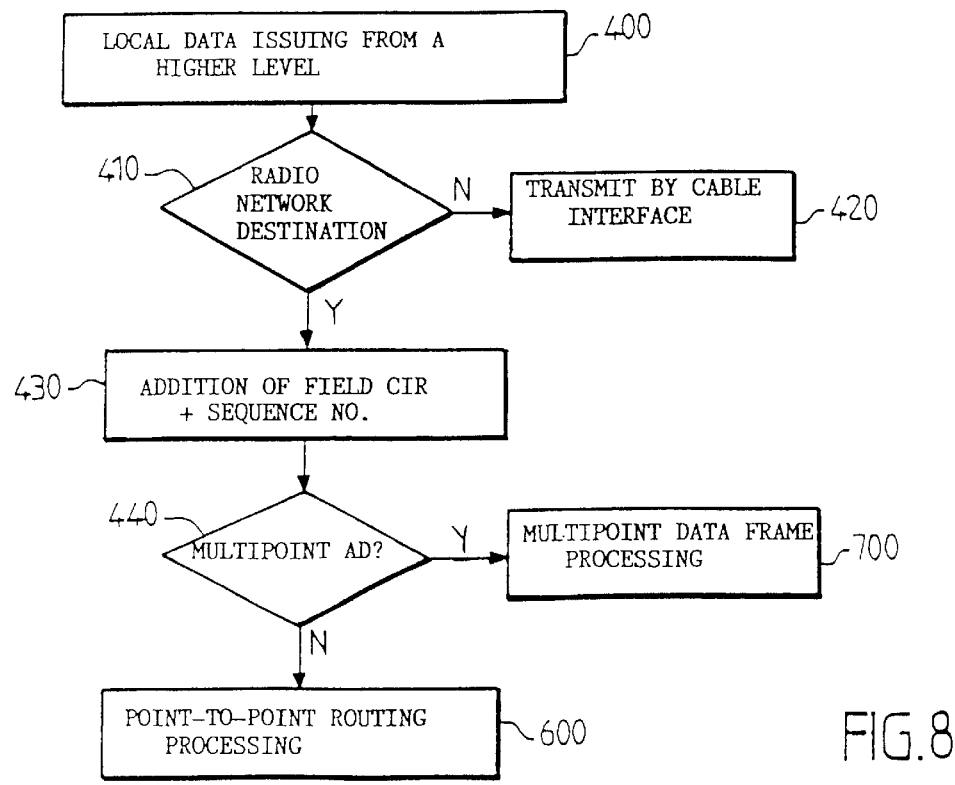
FIG. 8 is an outline block diagram illustrating the main steps of processing data generated locally with a view to sending them in the form of a frame.

Reference is now made to FIG. 8 in order to describe the shaping of a local data frame. In this particular case, it is the hybrid station H which decides to send data either to a single hybrid or mobile station (point-to-point processing), or to several hybrid and/or mobile stations (multipoint or broadcast processing).

When such is the case, the hybrid station H addresses, in a step 400, local data to be transmitted and the address or addresses of the hybrid or mobile station or stations to which it wishes to supply the local data. This transmission takes place via the higher network 8.

Then, in a step 410, the management module performs a first test so as to determine whether the network which will allow transmission of the data is the radio network. If the result of this first test is negative, that is to say if the transmission network is the cabled network, then the management module 9 performs, in a step 420, the shaping of the frame in the cabled network format, that is to say by encapsulating the data by means of the radio capsule encapsulated in the cable format CREC (ADI, ASI, SFE, CIC) (mixed capsule) and the appropriate fields AD, AS, CI, CP and CIR (see FIG. 3*b*).

On the other hand, if the result of this first test performed at step 410 is positive, that is to say if the destination station belongs to the radio network (mobile station M), then the management module, in a step 430, creates a field CIR (information field for the radio network) comprising the type of the local data and a sequence number (or frame number). Then, in a step 440, the management module 9 performs a second test so as to determine whether the local data must be processed by broadcasting (multipoint) or point-to-point. If the result of this second test is positive, that is to say if the local data must be broadcast, then the management module 9 passes to step 700 which was described previously. On the other hand, if the result of this second test performed at step 440 is negative, that is to say if the local data concern only a single mobile station, then the management module 9 passes to step 600 so as to effect a point-to-point processing.

Figure 10:
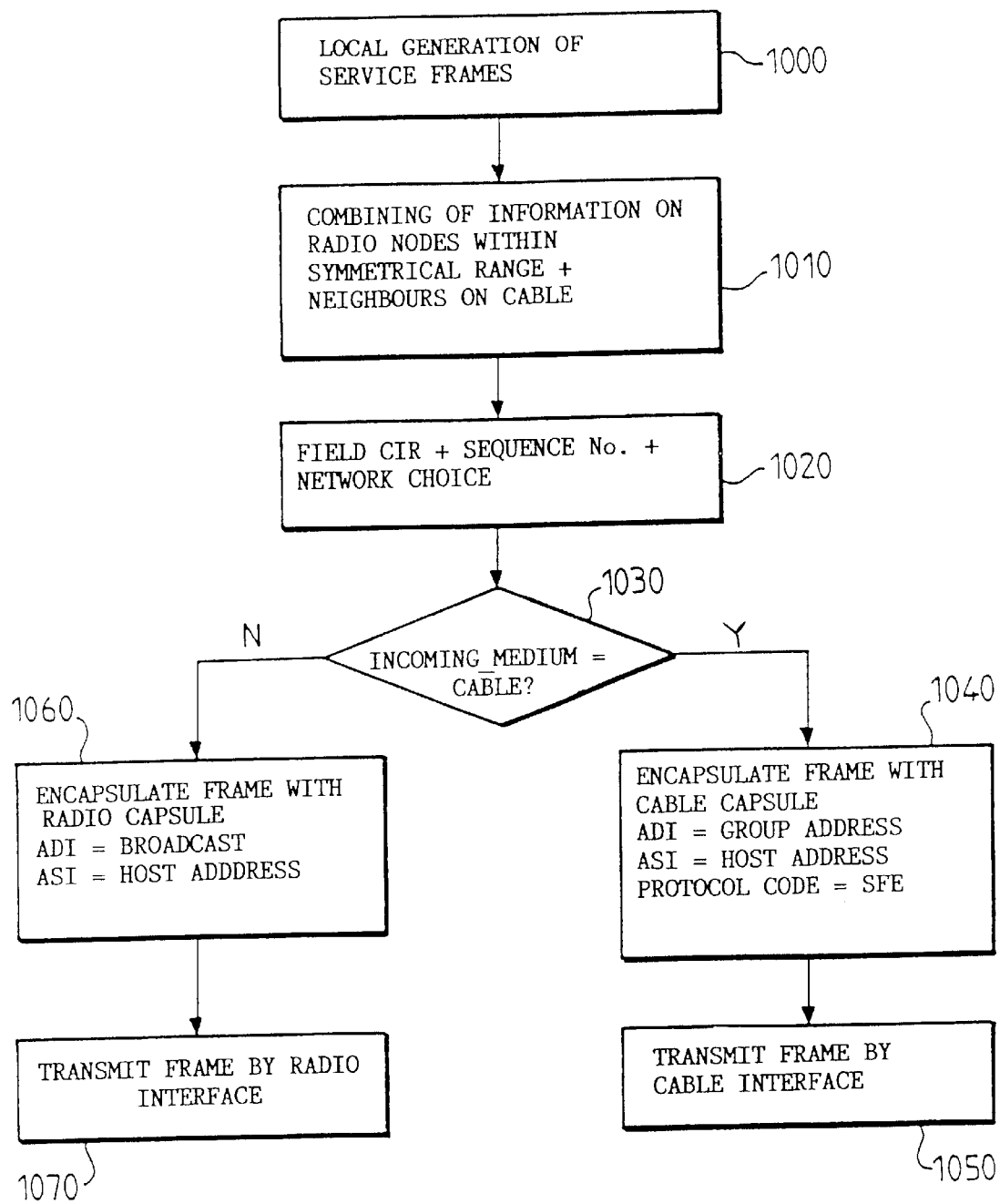
FIG. 10 is an outline block diagram illustrating the main steps of generating and sending a service frame associated with monitoring of the environment.

Reference is made now to FIG. 10 in order to describe the shaping of the service frames generated locally by a hybrid station containing a connection device according to the invention.

The local generation of a service message is not necessarily decided by a hybrid station, it can, according to the type of radio network chosen, be performed spontaneously at substantially regular time intervals, by the processing module 7 of the device. The shaping of a service frame therefore starts in a step 1000, either by means of a decision of the processing module 7, or by means of a request issuing from the higher level 8 of the hybrid station H.

Next, in a step 1010, the management module 9 determines a first subset of the list stored, preferably recently updated, of the nodes (or stations) listened to, a second subset of the list of nodes or mobile stations M within radio symmetrical range, and a third subset of the adjacent stations on the cable.

The management module 9 then, in a step 1020, creates a field CIR (information field on the radio network) comprising the type of service message (for example the fact that the service message is intended to monitor the vicinity), and a sequence (or frame) number. Moreover, in this step 1020, the management module 9 determines the network in which the first transmission will be effected by broadcasting of the service message.

In a step 1030, the management module 9 performs a test so as to determine whether the service frame transmission network, determined at step 1020, is the cabled network.

When the result of this test is positive, that is to say if the transmission network is the cabled network, then the management module 9, in a step 1040, encapsulates the service frame between the radio capsule encapsulated in the cable format CREC (containing the codes and fields ADI, ASI, SFE, CIC) (mixed capsule), the code ADI indicating preferably the group address of the hybrid stations connected to the cabled network and able to ensure broadcasting, the code ASI indicating the address of the hybrid station in which the management module 9 is located (host address), and the protocol code SFE indicating that the service message concerns the radio network since the hybrid stations form an integral part thereof. Then, in a step 1050, the processing module 7 transmits the frame encapsulated in the format of the cable (data plus cabled capsule CIC) to the sending module 3b of the cabled network interface 3 with a view to sending this encapsulated service frame in. the direction of the relay hybrid stations via the cable.

On the other hand, if the result of the test performed at step 1030 is negative, that is to say if the selected transmission network is not the cabled network, then the management module 9, in a step 1060, encapsulates the service frame in the format of the radio network. This consists of the addition of the appropriate radio capsule CR (fields ADI and ASI), the field ADI specifying the processing mode (hereby broadcast or multipoint) and the addresses of the relay or destination mobile stations, and the code ASI comprising the address of the hybrid station in which the management module 9 is located (the host address). Then, in a step 1070, the processing module 7 transmits the frame encapsulated in the format of the radio network to the sending module 4b of the radio network interface 4 with a view to the sending of this encapsulated frame over the ether in the direction of the selected mobile stations.

FIGS. 3d and 3e depict, by way of example, the formats of service frames intended to be sent respectively in the radio network and the cabled network.

The processing means of the devices can advantageously be arranged so as to allow a different addressing in the radio network and the cabled network. Thus the service frames which pass over the cable (ancillary cabled network) can contain the radio address of the sending hybrid station (provided, of course, that it has a radio interface), so that the other hybrid station can effect a conversion.

The invention is not limited to the embodiment described above solely by way of example, but extends to any variants which a person skilled in the art may develop within the scope of the following claims.

Thus, in the above, a main radio network of the CSMA type has been described, but the invention can apply also to other types of radio network, such as for example, and non-limitatively, networks of the "Periodic" TDMA type, such as DECT, or spread spectrum networks of the CDMA type, or similar, but also combinations of these networks.

In addition, an application of the connection device according to the invention has been described for coupling between a radio network and a cabled network. However, it is clear that the connection device according to the invention can allow an interconnection between several radio networks functioning on different channels, and according to different protocols, or between one or more radio networks and one or more cabled networks. It is clear that, in such applications, the number of network interfaces of a connection device will depend on the number of networks which it is supposed to connect.

In addition, a description has been given of a connection device provided with a number of sending network interfaces such as re-sending equal to the number of main and ancillary networks. However, the application applies also to the connection devices which do not have such "direct" network interfaces. This could notably be the case when the connection device is intended to be located in an IP (standing for "Internet Protocol") router, itself providing the interface, at the level of the Internet protocol, between the radio network connected to segments of cabled networks (in order to form what has been termed a "radio network extended over the cable") and the remainder of the other networks, such as for example a conventional cabled network, the radio network extended over the cable and the other networks then forming distinct Internet sub-networks.

Naturally, the connection device could also be located in a hybrid station not having any (main) radio interface in the strict sense of the word, and therefore having only interfaces with the ancillary network or networks. This could notably be the case when the hybrid station is under an IP router (Internet). In this case, the messages intended for the radio network extended over the cable would be routinely routed (or switched) onto the ancillary network by encapsulation with a protocol code SFE. This application is particularly advantageous when the router is situated geographically at a point which makes the radio interface inoperative.

In addition, the encapsulated frames illustrated in FIG. 3 have fields and codes (forming a header) given in a certain order. However, it is clear that this order could vary according to the application.

Finally, a description has been given of the mechanisms for processing service messages, enabling the formation of frames in the format of the cable network and in the format of the radio network, in which the service messages were presumed to be substantially identical, whether they concern only the cable network or only the radio network. However, it is quite clear that the service messages concerning different types of network can be different from each other. This is because, on the cabled network, it is not useful to check the symmetrical state of the links between adjacent stations, in consequence of which the messages intended to detect the proximity of a hybrid station will have no need to contain a list of the stations which this sending hybrid station is listening to on the cabled network. Likewise, the tables of the direct adjacent stations on the cabled network do not require frequent refreshing because the hybrid stations have a substantially more limited mobility than the mobile stations.

The foregoing disclosure and description of the invention is illustrative and explanatory thereof. Various changes within the scope of the claims hereto may be made without departing from the spirit of the invention.

What is claimed is:

1. Apparatus for connection between a segment of a "main" network communicating by way of messages provided with a main capsule complying with a protocol based on a first format and at least one segment of at least one "ancillary" network communicating by way of messages provided with an ancillary capsule complying with a protocol based on a second format, said apparatus comprising:
   a storage module able to store at least one routing table; and
   a processing module able to manage data exchanges according to the said routing table, said processing module including
   a management module having means to disencapsulate a message received from the said main network, by withdrawing its main capsule, so as to extract routing information therefrom, means to compare the said information with the said stored routing table in order to choose, from amongst the main and ancillary networks, at least one re-sending network segment for the said disencapsulated message and additionally to add to the said disencapsulated message a main capsule or a mixed capsule, including a main capsule and an ancillary capsule, depending on whether the re-sending network chosen is the main network or an ancillary network so as to send a thus re-encapsulated message, and means to add to said re-encapsulated message a protocol code designating the format of the segment of the main network from which the said received message came.

2. Apparatus according to claim 1, wherein said main network is a radio network and said at least one ancillary network is a cabled network.

3. Apparatus according to claim 2, wherein the format of a said radio network is chosen from at least the format of the "HIPERLAN" standard and the format of IEEE 802.11, and wherein the format of a said cabled network is chosen from at least the ISO standards for the standards IEEE 802.3, 802.5 and 802.14.

4. Apparatus according to claim 2, wherein the management module is able to extract, from a so-called "service" message, issuing from the main network, service information relating to modifications to the said routing table, so as to update this routing table.

5. Apparatus according to claim 4, wherein the management module has means to control the sending of service messages, not only at local request of a higher stage, but also as a transmission relay between distant connection devices, for exchanging routing information for updating the routing tables of each one.

6. Apparatus according to claim 5, wherein the said service messages are intended for the exchange of routing information for updating the routing tables of the said interconnection devices.

7. Apparatus according to claims 5, wherein the said processing means maintain at least one list of stations of the network segments which they receive, and are able to transmit this list in the form of the said service messages, which enables them mutually to maintain a list of the stations which receive them from the service messages which they receive.

8. Apparatus according to claim 1, wherein said main and ancillary networks are radio networks.

9. Apparatus according to claim 8, wherein the format of a said radio network is chosen from at least the format of the "HIPERLAN" standard and the format of IEEE 802.11.

10. Apparatus according to claim 1, wherein, in the case of reception of a message to be relayed by at least one other connection device, referred to as "intermediate", said management module has means to place the address of the said intermediate device in the capsule of the chosen ancillary re-sending network.

11. Apparatus according to claim 1, wherein said ancillary network segment is arranged so as to permit the use of group addresses each designating a predetermined set of connection devices.

12. Apparatus according to claim 11, wherein the management module is arranged to process so-called "broadcast" messages intended for several destinations in the said main network and passing over at least one of the said ancillary networks using a group address.

13. Apparatus according to claim 1, wherein said management module has means to determine the format of the main network in a message provided with a mixed capsule, so that the routing information for the said message is analysed only in the case of the presence of such a format.

14. Apparatus according to claim 13, wherein said means to add to said re-encapsulated message a protocol code designating the format of the segment of the main network from which the said received message came further comprises means to determine the said format by detecting the said protocol code.

15. Apparatus according to claims 1, wherein the management module is arranged to process so-called "service" messages issuing from ancillary network segments.

16. Apparatus according to claim 15, wherein the said service messages of an ancillary network are service messages of the main network provided with at least one ancillary capsule.

17. Apparatus according to claim 15, wherein some of the said service messages have a group address.

18. Apparatus according to claim 1, wherein the management module has means to transmit to a so-called "higher" processing layer the data contained in a message which has arrived at its destination.

19. Apparatus according to claim 18, wherein the management module has means to add to a message created locally by the said higher processing stage, a main capsule or a mixed capsule according to the said re-sending network segment determined according to the destination address of the said message and the said routing table, so as to send the said encapsulated message in the determined re-sending network segment.

20. Apparatus according to claims 19, wherein the processing means also maintain a topological directory designating at least some of the stations with which they can communicate, directly or indirectly, and define the route or routes of this communication.

21. Apparatus according to claim 20, wherein the processing means is arranged to optimize the choice of the sending (or re-sending) segment or segments as a function of at least one predetermined criterion.

22. Apparatus according to claim 21, wherein the criterion is chosen according to the characteristics of the main and ancillary networks.

23. Method of exchanging data, via a connection device having means for storing at least one routing table, between a segment of a "main" network communicating by way of messages provided with a main capsule complying with a protocol based on a first format and at least one segment of at least one "ancillary" network communicating by way of messages provided with an ancillary capsule complying with a protocol based on a second format, comprising the steps of:
- (a) withdrawing the main capsule of a message received by the connection device from the main network so as to extract routing information therefrom,
- (b) comparing the extracted information with the stored routing table in order to choose, from amongst the said main and ancillary networks, at least one re-sending network segment for the said disencapsulated message,
- (c) adding a main capsule or a mixed capsule to a disencapsulated message, said mixed capsule including a main capsule and an ancillary capsule, depending on whether the chosen re-sending network is the main network or an ancillary network, so as to permit the thus re-encapsulated message to be re-sent in the chosen re-sending network segment, and
- (d) adding to the re-encapsulated message a protocol code designating the format of the segment of the main network from which the message received in step (a) came.

* * * * *